United States Patent [19]

Deroche

[11] Patent Number: 4,773,672

[45] Date of Patent: Sep. 27, 1988

[54] HYDROPNEUMATIC SUSPENSION FOR MOTOR VEHICLES

[75] Inventor: Gabriel Deroche, Villemomble, France

[73] Assignees: Automobiles Peugeot, Paris; Automobiles Citroen, Neuilly sur Seine, both of France

[21] Appl. No.: 64,327

[22] Filed: Jun. 19, 1987

[30] Foreign Application Priority Data

Jul. 2, 1986 [FR] France .................. 86 09938

[51] Int. Cl.⁴ .................................. B60G 11/26
[52] U.S. Cl. .................... 280/708; 280/714; 280/DIG. 1; 280/6 R
[58] Field of Search ........ 280/6 H, 6 R, 708, DIG. 1, 280/714, 711

[56] References Cited

U.S. PATENT DOCUMENTS

| | | | |
|---|---|---|---|
| 3,736,000 | 5/1973 | Capgras | 280/708 |
| 3,945,664 | 3/1976 | Hiruma | 280/708 |
| 4,564,214 | 1/1986 | Tokunaga et al. | 280/708 |
| 4,566,718 | 1/1986 | Kanai et al. | 280/708 |
| 4,664,410 | 5/1987 | Richard | 280/714 |

FOREIGN PATENT DOCUMENTS

| | | | |
|---|---|---|---|
| 0124414 | 11/1984 | European Pat. Off. | 280/708 |
| 0213020 | 3/1987 | European Pat. Off. | 280/708 |

Primary Examiner—Kenneth R. Rice
Attorney, Agent, or Firm—Herbert Dubno

[57] ABSTRACT

A hydropneumatic suspension including, for each wheel, a suspension jack having a hydropneumatic accumulator and, for each axle, an additional hydropneumatic accumulator, a stiffness regulator adapted for placing this additional accumulator in or out of circuit under the effect of a hydraulic pressure acting against return means, and a height corrector adapted for connecting the suspension jacks, depending on the axle load, either with a pressurized liquid source or with the exhaust. The height corrector is connected, on the one hand, to the stiffness regulator so as to be connected or not to the suspension jacks at the same time as the additional accumulator and, on the other hand, to an auxiliary duct connecting the suspension jacks together.

9 Claims, 2 Drawing Sheets

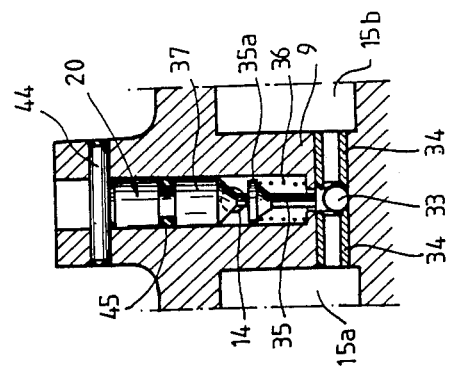
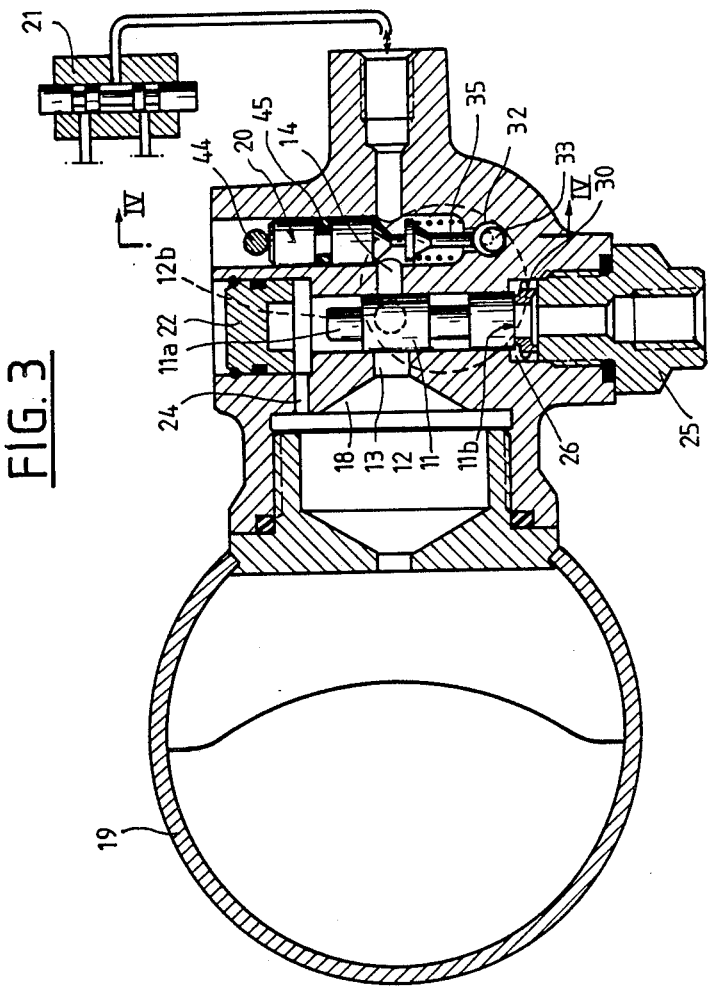

HYDROPNEUMATIC SUSPENSION FOR MOTOR VEHICLES

FIELD OF THE INVENTION

The present invention relates to a hydropneumatic suspension with variable flexibility for motor vehicles of the type including, for each wheel, a jack having a hydropneumatic accumulator and, for each axle, an additional hydropneumatic accumulator, a stiffness regulator adapted for bringing this additional accumulator into or out of circuit under the effect of a hydraulic pressure acting against return means and a height corrector adapted to connect the suspension jacks, depending on the axle load, either to a pressurized liquid source, or to a return. A suspension of this kind is described for example in French Pat. No. 2 569 624 (see also U.S. Pat. No. 4,664,410).

The height corrector must be able to come into operation when the regulator places the additional accumulator out of service; the means provided for this purpose in the known suspension do not give full satisfaction.

OBJECT OF THE INVENTION

The object of the present invention is to provide a hydropneumatic suspension in which the height corrector operates suitably whether the additional accumulator is in service or not.

SUMMARY OF THE INVENTION

In the suspension of the invention, the height corrector is connected both to a stiffness regulator so as to be connected or are not to be connected to the suspension jacks at the same time as the additional accumulator and to an auxiliary duct connecting the suspension jacks to each other.

When the stiffness regulator isolates the additional accumulator from the suspension jacks, the height corrector feeds these two jacks in a balanced way through the auxiliary circuit; when the stiffness regulator brings the additional accumulator into service, the height corrector feeds the two suspension jacks and the additional accumulator in a balanced way.

In a preferred embodiment of the invention, the auxiliary duct includes means for closing off the connection between the two suspension jacks if a flow of fluid tends to be established in this duct and the suspension further includes means for locking the closure means in the open position in the case of a flow of fluid coming from the height corrector.

When the height corrector is inactive and when the stiffness regulator isolates the additional accumulator from the suspension jacks, liquid cannot pass from one suspension jack to the other, which opposes rolling. This antiroll action is not exerted when the additional accumulator is in communication with the suspension jacks since these latter are thus connected to each other. Thus the antiroll action only takes place when the suspension is hard, which is just the case when this action is the most necessary.

The means for closing off the connection between the two suspension jacks may be formed by a ball movable between two seats formed in the auxiliary duct, this ball being immobilized between the two seats by a pusher which is subjected to the action of a return spring and has a mobile collar with calibrated diametrical play in a chamber in communication with the height corrector.

The stiffness regulator may include a spool movable in a cylinder a first end of which is in communication with the additional accumulator and a second end of which may be connected to a control pressure source of a value greater than that of the pressure of this additional accumulator.

The second end of this cylinder may contain a floating seal made from a malleable material which is crushed by the spool against the bottom of the cylinder, under the effect of the pressure reigning in the additional accumulator, when communication between the cylinder and the control pressure source is interrupted. This seal prevents leaks and thus ensures that the pressure is maintained in the additional accumulator for an operation of long duration, the accumulator being isolated from the suspension jacks. Since this accumulator is normally isolated from the jacks, this seal further prevents the vehicle, when stopped, from collapsing on its bearing stops.

The connection between the second end of the cylinder and the control pressure source may be provided by an electromagnetic valve controlled by sensors, for example a sensor sensing the angular position and the turning weight of the steering wheel, an acceleration sensor, a deceleration sensor, a vehicle speed sensor and a sensor detecting the deflection amplitude and rate of the wheels. Thus excellent lateral stability is obtained in bends and during turning of the steering wheel, excellent longitudinal stability during high acceleration and deceleration as well as better absorption of hollows and bumps in the road.

BRIEF DESCRIPTION OF THE DRAWING

One embodiment of the suspension of the invention will be described hereafter by way of non limitative example, with reference to the accompanying drawing in which:

FIG. 3 is a sectional view taken along the line III—III of FIG. 1; and

FIG. 4 is a sectional view taken along the line IV—IV of FIG. 3.

SPECIFIC DESCRIPTION

Figures 1, 2:
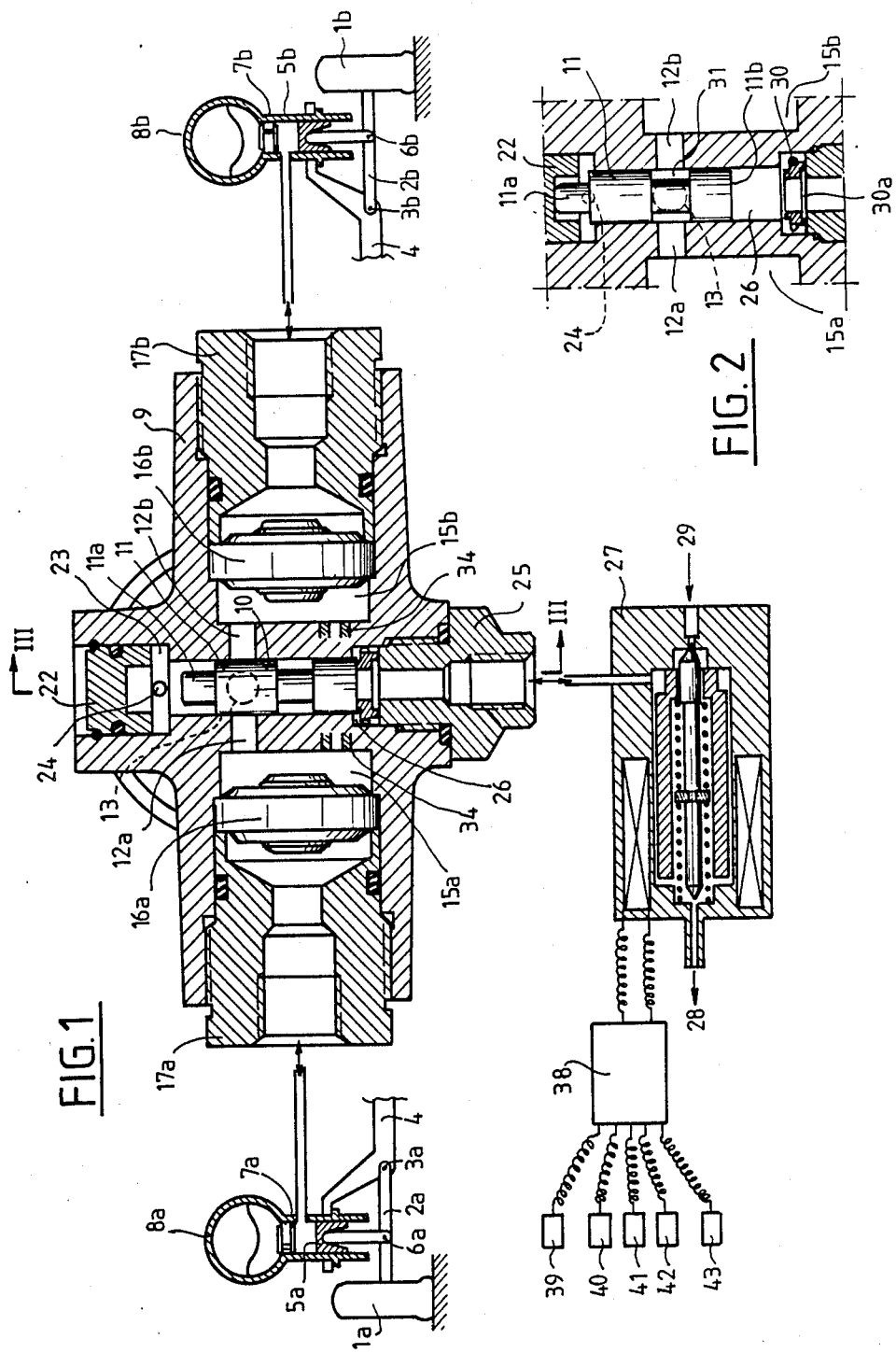
FIG. 1 is a general view of the suspension, the additional accumulator being isolated from the suspension jacks and showing parts in section.
FIG. 2 is a detail of FIG. 1 in the portion in which the additional accumulator is connected to the suspension jacks.

In FIG. 1 an axle has been shown having a left hand wheel 1a and a right hand wheel 1b each of which is carried by an arm 2a or 2b mounted for pivoting at 3a or 3b to a cross piece 4. The suspension of the axle includes two jacks whose pistons 5a and 5b are mounted for pivoting at 6a and 6b to arms 2a and 2b and whose cylinders 7a and 7b are fixed or pivotally mounted to the cross piece 4. Cylinders 7a and 7b are in hydraulic communication with hydropneumatic wheel accumulators 8a and 8b whose membranes separate liquid chambers and gas chambers.

The two cylinders 7a and 7b of the suspension jacks are connected together by a stiffness modulator including a body 9 with a cylindrical bore 10 in which is slidably mounted a spool 11.

Into bore 10 open three holes 12a, 12b and 13 as well as a duct 14 having their axes situated in the same plane perpendicular to the axis of bore 10. Hole 12a opens into a cavity 15a which is connected by a damping device 16a to a connection 17a itself in communication with the suspension cylinder 7a. For its part, hole 12b opens into cavity 15b connected similarly to the suspension cylinder 7b. Hole 13 opens into a chamber 18 in which is mounted an additional hydropneumatic accumulator 19 (See FIG. 3). Duct 14 is connected to a height correcting device 21.

One of the ends of bore 10 is closed by a plug 22. Cavity 23 which is closed by this plug and in which the end 11a of spool 11 moves, communicates through a hole 24 with chamber 18 and thus also communicates with the additional accumulator 19. The other end of bore 10 is closed by a stop connector 25 and cavity 26 situated between this connector and end 11b of the spool may be placed in communication through a three way electromagnetic valve 27 either with the exhaust 28, or with a pressure source 29 having a value greater than the pressure reigning in the suspension, and thus in cavity 24. In cavity 26, between the end 11b of spool 11 and the stop connector 25 is inserted a floating seal 30, made from a malleable material which provides the seal between the spool and the connector when the electromagnetic valve 27 is connected with the exhaust and when the spool is applied on the stop by the pressure of the suspension. This seal 30 has, on its face opposite the spool, a recess 30a of a section at least as large as that of the spool so that the force resulting from the pressure on the surface contained inside the sealing zone of this seal with the stop connector 25 largely counterbalances the force resulting from the suspension pressure on the opposite surface of the spool so as to cause movement of the spool in all cases despite the friction.

When the electromagnetic valve 27 is switched on, cavity 26 is connected to the high pressure source 29 and the spool 11 is brought to the position shown in FIG. 2, in which its end 11a abuts against plug 22. Spool 11 includes a groove 31 which, in this position, provides total communication between holes 12a, 12b and 13 and the duct 14.

Cavities 15a and 15b are connected together by a bore 32 in which a ball 33 may move and each of the ends of which includes a seat 34 for this ball. This latter prevents any transfer of liquid between cavities 15a and 15b so between the left hand and right hand suspension elements, but allows a pressure balance between these two cavities when liquid passes from or to the height correction device 21.

A spring 36 tends to apply a pusher 35 on a plug 30 serving as stop. Plug 20 is mounted on a pin 44 so as to withstand the force exerted by the hydraulic pressure. It is provided with an O seal 45 ensuring sealing. Pusher 35 is dimensioned so as to leave a calibrated diametrical clearance between a collar 35a of the pusher and body 9 so that a flow rate is possible compatible with height correction when rolling. During admission of liquid from the height corrector 21, the flow rate in the calibrated clearance existing about collar 35a creates a pressure drop in the force exerted on pusher 35 which is sufficient to overcome spring 36 and push the ball 33 against the wall of duct 32 while preventing it from being applied to one or other of seats 34.

The electromagnetic valve 27 is controlled by an electronic processor 38 which receives information from a sensor 39 detecting the angular position and the turning rate of the steering wheel, from an acceleration sensor 40, a deceleration sensor 41, a vehicle speed sensor 42 and a sensor 43 detecting the deflection amplitude and rate of the wheels. The processor 38 analyses this information and controls the electromagnetic valve so as to have the following states:

(1) when the vehicle is stopped and the ignition turned off, whatever the state of the other variables, the electromagnetic valve 27 is not switched on and the additional hydropneumatic accumulator 19 is not connected to the suspension jacks.

(2) when the ignition is switched on and when the speed of the vehicle is less than a certain threshold, whatever the state of the other variables, the electromagnetic valve 27 is switched on and accumulator 19 is connected to the jacks.

(3) beyond a certain vehicle speed, either for an angle of the steering wheel greater than a certain value, or for a moving speed of the steering wheel greater than a certain value depending on the speed of the vehicle, or when the acceleration or deceleration exceeds a certain value, or when the wheels deflect above a certain value, with a deflection rate greater than a given value, the electromagnetic valve 27 is not switched on and the additional accumulator 29 is not connected to the suspension jacks.

It goes without saying that the present invention should not be considered as limited to the embodiment described and shown but, on the contrary, covers all variants thereof.

What is claimed is:

1. A hydropneumatic suspension comprising: for each wheel, a jack with a hydropneumatic accumulator and, for each axle, an additional hydropneumatic accumulator, a stiffness regulator adapted to switch this additional accumulator into or out of circuit under the effect of a hydraulic pressure acting against return means: a height corrector adapted for connecting the suspension jacks, depending on the axle load, either with a pressurized liquid source or with the exhaust, said height corrector is connected to the stiffness regulator so as to be connected or not to the suspension jacks at the same time as the additional accumulator and to an auxiliary duct connecting the suspension jacks together.

2. A hydropneumatic suspension comprising:
   for each wheel, a jack with a hydropneumatic accumulator and, for each axle, an additional hydropneumatic accumulator, a stiffness regulator adapted to switch this additional accumulator into or out of circuit under the effect of a hydraulic pressure acting against return means:
   a height corrector adapted for connecting the suspension jacks, depending on the axle load, either with a pressurized liquid source or with the exhaust, said height corrector being connected to the stiffness regulator so as to be connected or not to the suspension jacks at the same time as the additional accumulator and to an auxiliary duct connecting the suspension jacks together;
   closure means in said auxiliary duct for closing the connection between the two suspension jacks upon fluid flow in said duct; and
   means for locking said closure means in an open position in the case of a flow of fluid coming from the height corrector.

3. The suspension defined in claim 2, wherein the means for closing the connection between the two suspension jacks are formed by a ball movable between two seats formed in said auxiliary duct, said ball being able to be immobilized between the two seats by means of a pusher which is subjected to the action of a return spring and has a mobile collar with a calibrated diametrical clearance in a chamber in communication with the height corrector.

4. The suspension as claimed in claim 2, wherein the stiffness regulator includes a spool movable in a cylinder, a first end of which is in communication with the additional accumulator and the second end of which may be connected to a control pressure source of a value greater than that of the pressure of this additional accumulator.

5. The suspension as claimed in claim 4, wherein said second end of the cylinder contains a floating seal made from a malleable material which is crushed by the spool against the bottom of the cylinder, under the effect of the pressure reigning in the additional accumulator, when the communication between the cylinder and the control pressure source is interrupted.

6. The suspension as claimed in claim 5, wherein said seal includes a recess in which the control pressure is applied against a surface sufficient for moving the spool.

7. The suspension as claimed in claim 4, wherein said connection between the second end of the cylinder and said control pressure source is provided by an electromagnetic valve controlled by sensors, including at least one a sensor detecting the angular position and turning rate of the steering wheel, an acceleration sensor, a deceleration sensor, a vehicle rate sensor and a sensor detecting the deflection amplitude and speed of the wheels.

8. A hydropneumatic suspension comprising:

for each wheel, a jack with a hydropneumatic accumulator and, for each axle, an additional hydropneumatic accumulator, a stiffness regulator adapted to switch this additional accumulator into or out of circuit under the effect of a hydraulic pressure acting against return means;

a height corrector adapted for connecting the suspension jacks, depending on the axle load, either with a pressurized liquid source or with the exhaust, said height corrector being connected to the stiffness regulator so as to be connected or not to the suspension jacks at the same time as the additional accumulator and to an auxiliary duct connecting the suspension jacks together said stiffness regulator including a spool movable in a cylinder, a first end of which is in communication with the additional accumulator and the second end of which may be connected to a control pressure source of a value greater than that of the pressure of this additional accumulator; and a floating seal in said second end of the cylinder made from a malleable material which is crushed by the spool against the bottom of the cylinder, under the effect of the pressure reigning in the additional accumulator, when the communication between the cylinder and the control pressure source is interrupted.

9. The suspension defined in claim 8, wherein said seal includes a recess in which the control pressure is applied against a surface sufficient for moving the spool.

* * * * *